US 6,731,933 B2

(12) United States Patent
McCormick

(10) Patent No.: US 6,731,933 B2
(45) Date of Patent: May 4, 2004

(54) METHOD AND APPARATUS FOR IDENTIFYING ACCESS TECHNOLOGIES

(75) Inventor: Mark Alan McCormick, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 554 days.

(21) Appl. No.: 09/812,197

(22) Filed: Mar. 19, 2001

(65) Prior Publication Data

US 2002/0160774 A1 Oct. 31, 2002

(51) Int. Cl.[7] ................................................. H04Q 7/20
(52) U.S. Cl. ..................................... 455/432.1; 455/433
(58) Field of Search ........................... 455/432.1, 432.2, 455/432.3, 433, 435.1, 435.2, 426.1, 552.1, 553.1

(56) References Cited

U.S. PATENT DOCUMENTS 6,097,950 A * 8/2000 Bertacchi ................. 455/432.2
6,389,008 B1 * 5/2002 Lupien et al. ............. 370/352
6,615,037 B1 * 9/2003 Bharatia et al. ........... 455/417
2003/0104812 A1 * 6/2003 Easley ...................... 455/433

* cited by examiner

Primary Examiner—Lee Nguyen
Assistant Examiner—Sanh Phu

(57) ABSTRACT

An apparatus includes a home location register (203) that stores records for mobile units in a home system (201). A visited location register (213) stores records for mobile units presently registered in a visited system (211) in which the visited location register (213) is located. The visited system (211) identifies a last accessed technology by a mobile unit (221) in the visited system (211) and forwards the identification of the last accessed technology to the home location register (203). The identification of the last accessed technology may be forwarded to the home location register (203) in a registration notification. The home system (201) may forward a routing request including the identification of the last accessed technology to the visited system (213).

25 Claims, 3 Drawing Sheets

METHOD AND APPARATUS FOR IDENTIFYING ACCESS TECHNOLOGIES

FIELD OF THE INVENTION

This invention relates to communication systems, including but not limited to identifying access technologies in wireless communication systems.

BACKGROUND OF THE INVENTION

Various types of cellular communication systems are known to provide radio telephone service to a large number of mobile subscribers using a relatively small number of frequencies. Such service is provided by dividing a service area into a number of cells and reusing the frequencies in non-adjacent cells. This cellular principle has permitted a large growth in the amount of wireless telecommunications that may be carried over the allocated radio spectrum thus providing significant expansion in the number of wireless communication subscribers.

Cellular systems utilize many different technologies for communication access. The oldest type of cellular system is an analog system. Another cellular system is a digital system that is based upon time division multiple access (TDMA) techniques, such as that defined in Telecommunications Industry Association Interim Standard (TIA) IS-136. Yet another cellular system employs code division multiple access (CDMA) techniques and is defined in TIA IS-95. Still another cellular system combines TDMA and frequency division multiple access (FDMA) techniques and is known as the Global System for Mobile Communications (GSM), that was developed by Groupe Special Mobile of the European Conference of Posts and Telecommunications (CEPT) and its successor, the European Telecommunications Standard Institute (ETSI).

When a mobile roams in a system that is not its home system, the mobile may access any technology that the system provides and with which the mobile is capable of communicating. When call activity for the mobile is routed to the home system, it may not know which technology the mobile is presently using to access a visited system, and the visited system may flood all technologies in the system with pages to find the mobile. Such a process is a very inefficient use of resources and may cause congestion on the forward control channels for the various systems.

Accordingly, there is a need for a method to find a mobile in a multiple-technology environment without wasting bandwidth on the forward control channels for each technology.

SUMMARY OF THE INVENTION

A visited system receives a registration request to access the visited system via an access technology for a mobile unit that is associated with a home system having a home location register. A registration notification, including an identification of the access technology, is forwarded to the home location register.

DESCRIPTION OF A PREFERRED EMBODIMENT

The following describes an apparatus for and method of finding a mobile in a multiple-technology environment without unduly wasting bandwidth on the forward control channels for each technology. When a mobile unit, located in a visited system, accesses a different technology, the visited system forwards the last accessed technology (LAT) to the home system of the mobile. When call activity for the mobile unit is received at the home system, the home system forwards the LAT to the system where the mobile was last known to be located. The visited system pages the mobile on the LAT, and when the mobile responds, the call activity is forwarded to the mobile unit in a format consistent with the access technology. By paging only on the last accessed technology, bandwidth is saved on the forward control channels of the other technologies.

An apparatus of the present invention comprises a home location register, arranged and constructed to store records for one or more mobile units in a home system. A visited location register is arranged and constructed to store records for one or more mobile units presently registered in a visited system in which the visited location register is located. The visited system is arranged and constructed to identify a last accessed technology by a mobile unit in the visited system and forward the identification of the last accessed technology to the home location register. The identification of the last accessed technology may be forwarded to the home location register in a registration notification. The home system may be arranged and constructed to forward a routing request including the identification of the last accessed technology to the visited system.

Figure 1:
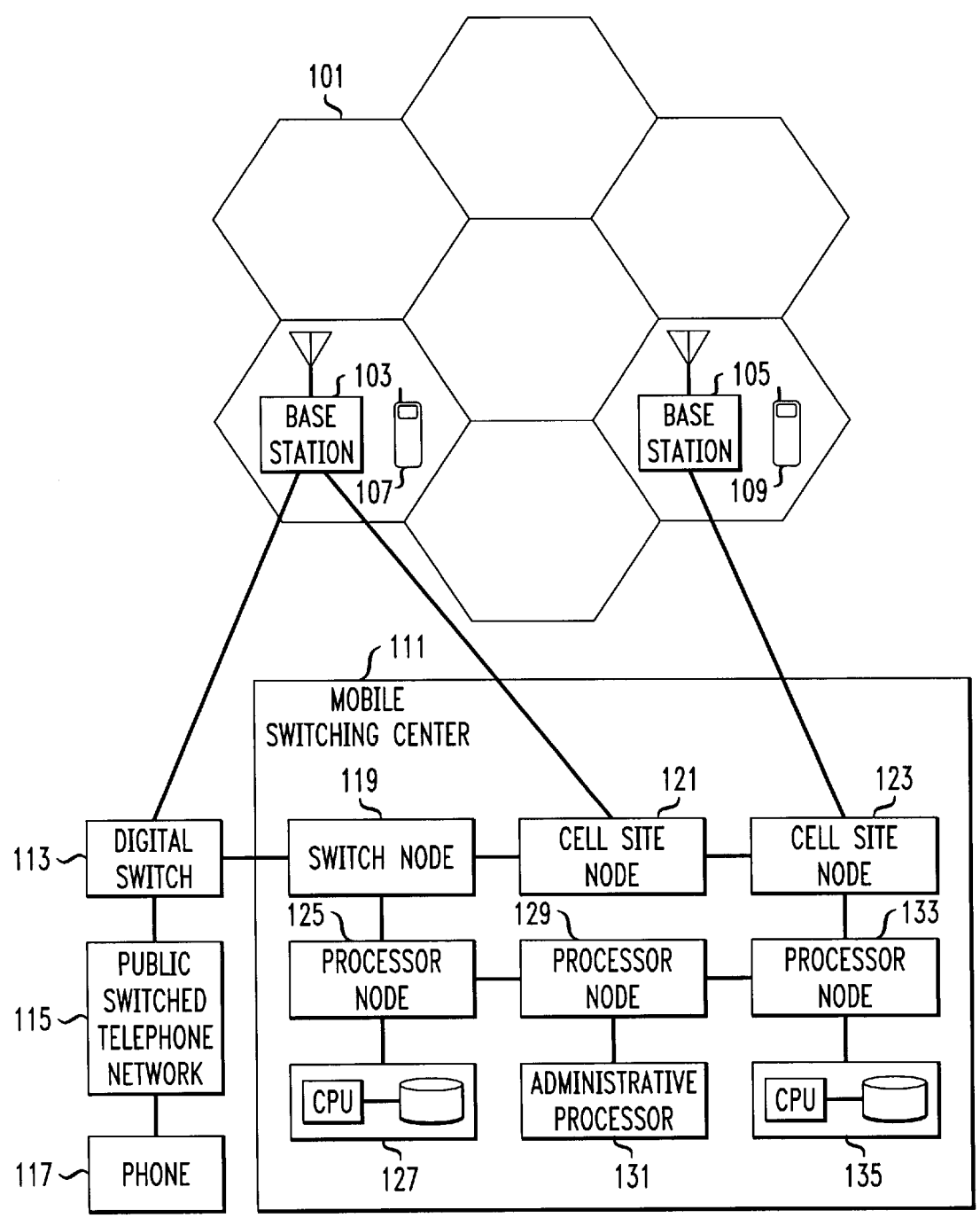
FIG. 1 is a block diagram of a wireless communication system in accordance with the invention.

FIG. 1 is a block diagram of a wireless communication system. A plurality of geographic coverage areas 101 are each supported by cell sites. Each cell site includes one or more base stations 103 and 105 to provide communications for mobile subscribers (units) 107 and 109 located in the coverage areas defined for the cell site. The base stations 103 and 105 are connected to a mobile switching center (MSC) 111 via bi-directional trunks, voice radio links, and control radio links. Although only one base station 103 is shown connected to a digital switch 113 for illustrative purposes, all base stations in the system are connected to the digital switch 113. Two base stations are shown for the sake of simplicity, although one or more base stations serve each cell site in the system. Only two mobile subscribers, as are commercially available, are shown although many subscribers are served by the system. In this example, the digital switch 113 is connected to the public-switched telephone network (PSTN) 115. Also shown is telephone 117 served by the PSTN 115.

In the preferred embodiment, the MSC 111 is an AUTOPLEX® 1000 system manufactured and sold by Lucent Technologies. Those skilled in the art, however, will recognize that other mobile switching centers may be used. The MSC 111 comprises a plurality of interconnected nodes and a plurality of processors for administering wireless communication services and storing subscriber data. The digital switch 113 is interconnected to the MSC 111 via a switch node 119. In this embodiment, a cell site node 121 serves one base station 103 and its associated site and another cell site node 123 serves the other base station 105 and its associated site. The switch node 119 is an interface between the MSC 111 and the digital switch 113.

A processor node 125 is connected to a call processor 127, which includes a central processing unit (CPU) and a database. The database stores information including authentication algorithms, control information, and other information relevant to the cell sites served by the process node 125. Another processor node 129 connects to an administrator processor 131, which performs maintenance functions and other administrative tasks for the MSC 111, as known in the art. A third processor node 133 connects to a call processor 135, which also includes a CPU and a database. The database also stores information including authentication algorithms, control information, and other information relevant to cell sites served by the third process node 133.

During normal operation, the call processors 127 and 135 receive registration (access) requests from mobile subscribers 107 and 109 located in the coverage areas 101. These registration requests may be in the form of a call origination request occurring when a subscriber places a call, a termination request when a subscriber receives a call, or an autonomous registration occurring when a subscriber simply turns a mobile terminal "on". The call processors determine the authenticity of each mobile terminal requesting access, and establish voice channels, control channels, or call connections for the mobile terminal in accordance with procedures well known in the art.

Figure 2:
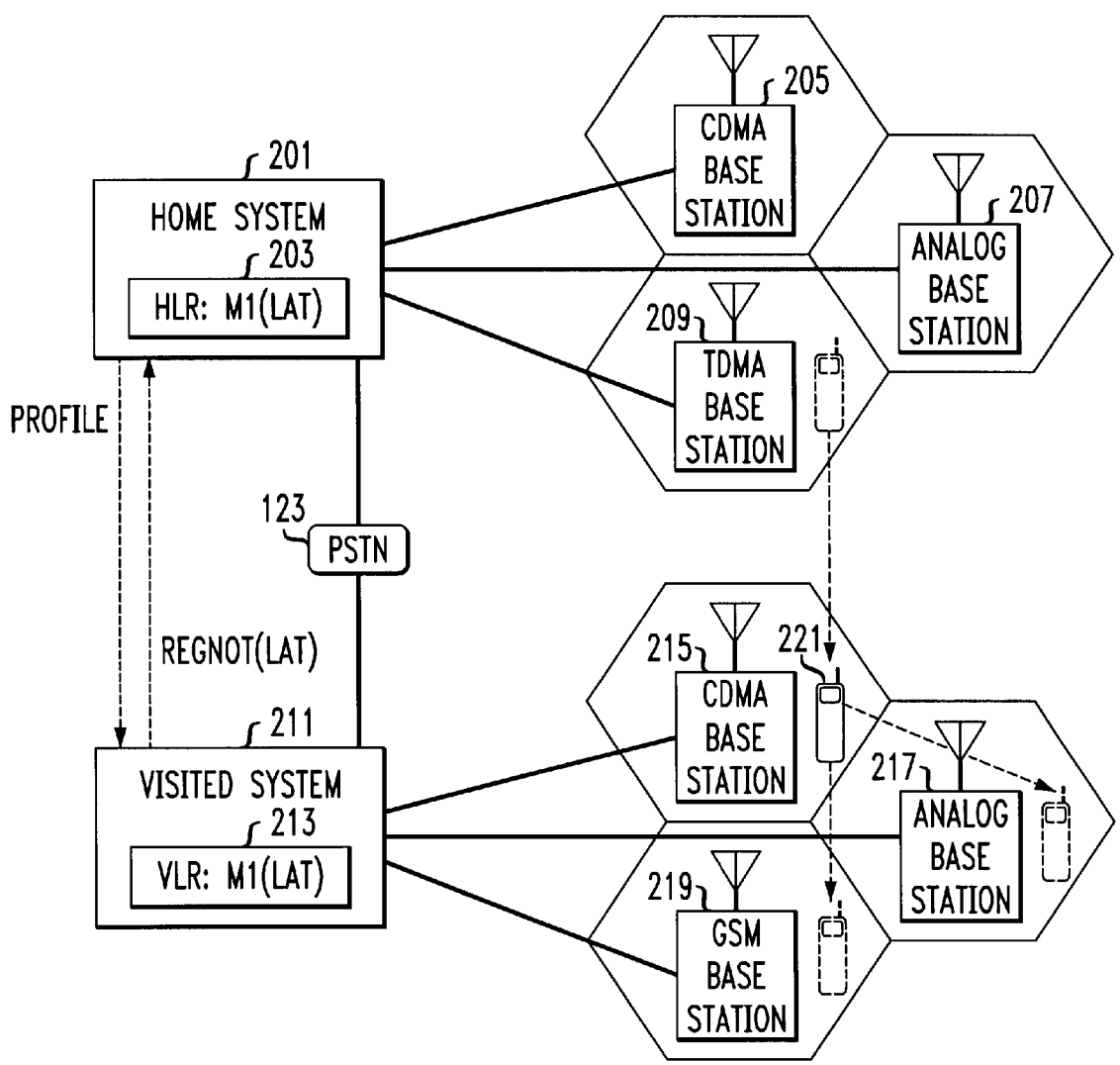
FIG. 2 is a block diagram showing registration-related communications between communication systems in accordance with the invention.

A block diagram illustrating registration-related communications between communication systems is shown in FIG. 2. A home system 201 comprises an infrastructure similar to that shown in the system shown in FIG. 1 and is connected to the PSTN 123. The home system 201 comprises a home location register (HLR) 203 that stores information, such as unit profile, including access rights, identifications, billing information, call features, LAES (Lawfully Authorized Electronic Surveillance) information, call forwarding numbers, and so forth, for mobile subscribers that utilize this system as its home system, as known in the art. The HLR 203 is located in the administrative processor 131 of FIG. 1. The home system 201, in the example shown, supports CDMA (code division multiple access), analog, and TDMA (time division multiple access) communications via base stations 205, 207, and 209, respectively, that provide service for these communication access technologies. Other types of access technologies, such as PCS (Personal Communication Services), UMTS (Universal Mobile Telecommunications System), and GSM (Global System for Mobile Communications) may also be supported in the system. Although only one type of access technology is shown in each coverage area, more than one type of access technology may provide service to a coverage area.

A visited system 211 comprises an infrastructure similar to that shown in the system shown in FIG. 1 and is connected to the PSTN 123. The visited system 211 comprises a visited location register (VLR) 213 that stores information, such as unit profile, including access rights, identifications, billing information, call features, LAES information, and so forth, in the form of records for mobile subscribers that are presently registered in this system 211, as known in the art. The VLR 213 is located in the administrative processor 131 of FIG. 1, and copies of the information may also be present in the processor nodes 125, 129, and 133. The visited system 211, in the example shown, supports CDMA, analog, and GSM (global system for mobile communications) communications via base stations 215, 217, and 219, respectively, that provide service for these communication access technologies. Other types of access technologies, such as PCS (Personal Communication Services), UMTS (Universal Mobile Telecommunications System), and TDMA, may also be supported in the system. Although only one type of access technology is shown in each coverage area, more than one type of access technology may provide service to a coverage area.

A mobile unit 221 having identification M1 has roamed from its home system 201 into the visited system 211 and sends a registration request to the visited system 211. The mobile unit 211 is capable of communication access via CDMA, analog, and TDMA technologies. In the example shown, the mobile unit 221 roams into an area covered by a CDMA base station 215 and registers with the system 211. The visited system 211 sends or forwards a registration notice (REGNOT) to the home system 201. The REGNOT includes the last accessed technology (LAT) of the mobile, e.g., CDMA in this example. The home system 201, upon receipt of the REGNOT, updates the HLR 203 with the new LAT for the mobile unit 221 and forwards the mobile unit's 221 profile to the visited system 211, which stores the profile, including the LAT, in the VLR 213 for the mobile unit 221. Messages are transferred between the systems via CSS7 or X.25 communication lines. Messages in the ANSI-41 network utilize the ANSI TCAP (Transaction Capabilities Application Part) protocol.

An example of a format for an LAT is shown in TABLE 1. The LAT is incorporated in an optional part of a message, such as the ANSI-41 (American National Standards Institute) messages called Registration Notices, Route Requests, and Location Requests. The LAT values may be, for example, 0=unknown, 1=analog, 2=TDMA, 3=CDMA, 4=PCS, 5=GSM, 6=UMTS.

TABLE 1

| Transaction ID | Next in order (as assigned by ANSI-41) |
| --- | --- |
| Size | Variable (1 octet to start with) |
| Values | 0 Unknown |
| | 1 Analog |
| | 2 TDMA |
| | 3 CDMA |
| | 4 PCS |
| | 5 GSM |
| | 6 UMTS |
| | 7 reserved for future use |
| | ... |
| | 255 reserved for future use |

In the event the mobile unit 221 affiliates with a base station 217 or 219 that services a different access technology then the one provided by the last base station 215 the mobile 221 affiliated with, the visited system 211 stores the new access technology in the LAT for the mobile 221 and forwards a registration notice to the home system 201. In the preferred embodiment, this registration notice includes a request not to return profile information in response to the registration notification, which saves bandwidth and time over the communication channels between the systems 201 and 211. The home system 201 updates the HLR 203 with the new LAT for the mobile unit 221.

By storing LAT data at the HLR 203 for the mobile unit 221, the home system 201 is able to quickly and concisely forward communications to the subscriber 221. When an incoming call to the mobile 221 is received at the home system 201, the home system 201 forwards the call to the visited system 211 in a format consistent with the last accessed technology. The visited system pages the system using the last accessed technology, e.g., CDMA, thereby saving resources in the system by not paging other technologies, such as analog, TDMA, and PCS. In the preferred embodiment, the LAT and MPCI from a VLR is utilized if a VLR exists, for example at the paging MSC, otherwise the LAT and MPCI are taken from the message from the home system. Bandwidth savings are especially advantageous on the analog systems, for which the forward control channels are typically crowded.

Figure 3:
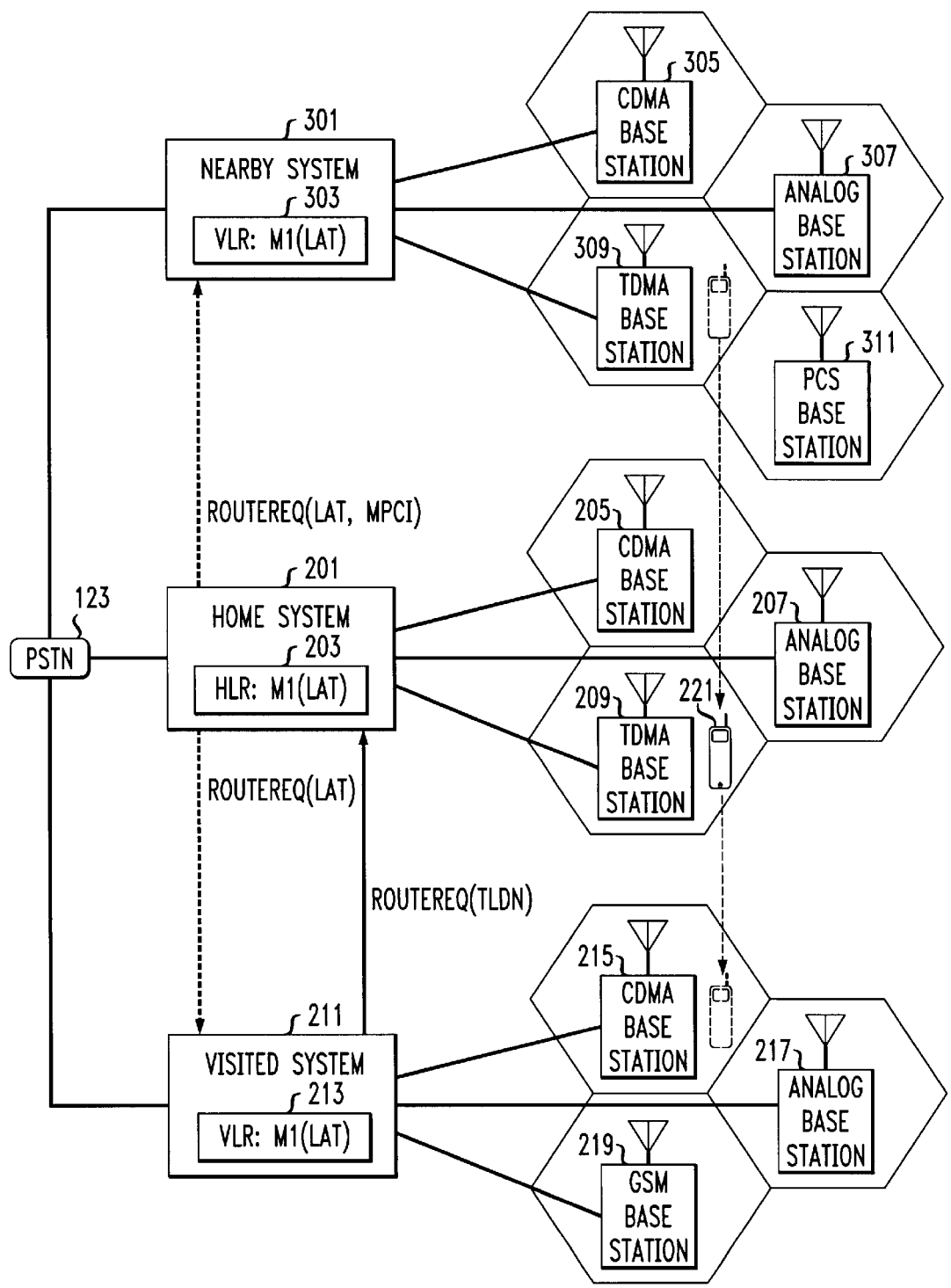
FIG. 3 is a block diagram showing intersystem communications for call activity in accordance with the invention.

A block diagram illustrating intersystem communications for call activity is shown in FIG. 3. In the example shown, call activity directed to the mobile 221, such as an incoming call, a short message service delivery, a message waiting notification or indicator for voice mail, is forwarded by the PSTN 123 to the home system 201, e.g., the home/host MSC, where it is received. The home system 201 looks in its HLR 203 for the current location and last accessed technology for the mobile 221. In the simple example where the mobile 221 from the home system 201 is currently registered and located in the visited system 211 at a base station 215 servicing CDMA technology, the home system 201 sends a route request (ROUTEREQ) including an LAT to the visited system 211. The route request may be any route request as known in the art, such as one compliant with ANSI-41, but additionally has an LAT field. The visited system 211 sends a route request including a temporary local directory number (TLDN) or routing number to the home system 201, which uses the TLDN to forward the call from the PSTN 123 to the mobile unit 221 via the visited system 211. The call activity for the mobile 221 is routed to the mobile unit 221 in a format consistent with the LAT. If the unit is not found, the visited system 211 optionally notifies the home system 201 of the mobile's 221 failure to respond.

In many systems, a mobile's VLR is deleted after the mobile has ceased to operate in the system for a given time or after a time-out that begins once the VLR record is set up. The mobile may still be in the coverage area of the system or may have roamed into another system once the VLR is deleted. In the example where an incoming call comes into the home system 201 for the mobile 221, but the VLR 213 for the mobile has been deleted, the home system 201 sends a route request (ROUTEREQ) including an LAT to the visited system 211. The visited system stores the LAT for the mobile 221 in a call register for the duration of the call, and pages the mobile 221 utilizing the LAT. By paging on the last accessed technology (LAT) rather than all technologies serviced by the system, bandwidth is saved on the technologies other than the LAT. The ROUTEREQ is typically a two page scenario, in which the first page is used to obtain current location/existence of the mobile and to request a TLDN to route the call. Once the TLDN is returned, the mobile is paged again, using the LAT/MPCI, and the call is delivered. If the mobile 221 is found, the call activity for the mobile 221 is routed to the mobile unit 221 in a format consistent with the LAT.

If no response is received by paging on the LAT, the other technologies may then be paged to search for the mobile. If the mobile 221 is found on another technology, the call activity for the mobile 221 is routed to the mobile unit 221 in a format consistent with the technology on which the mobile 221 is found. When the mobile is found, a VLR including the LAT may be created.

Under various circumstances, a page to the VLR at its last known location, either in its home system 201 or a visited system 211, will not find the mobile 221. These circumstances include, for example, (a) when a mobile has roamed, but not yet registered; (b) when the network is congested and the registration notification is dropped during overload (or an autonomous registration); (c) when the VLR has timed out but the mobile has not autonomously registered again or accessed the call via origination or termination; (d) when the mobile moves into an area that is not autonomous registration capable or the feature is not activated; (e) when the mobile is on a border of two or more cells serving two or more systems and is "ping-ponging" between the systems, a snapshot of the last location may be incorrect when the ROUTEREQ is sent out (as seen, for example, in CDMA systems). In this situation, the home system 201 tries to find the mobile 221 in a nearby system 301. The nearby system 301, which is typically located geographically near the home system 201, has a VLR 303 and supports CDMA, analog, TDMA, and PCS communications via numerous base stations 305, 307, 309, and 311, respectively. Under these circumstances, the home system sends a route request including an LAT to page the mobile 221. The nearby system 301 pages the mobile according to the LAT, and optionally stores the LAT in the VLR 303 for the mobile M1 221.

In an alternative embodiment, the home system 201 sends a mobile protocol capability indicator (MPCI) for the mobile 221 to the nearby system 301 in addition to or in place of the LAT. The MPCI includes a list of technologies with which the mobile 221 is capable of communicating. If the nearby system 301 fails to reach the mobile 221 by paging according to the LAT, the nearby system 301 may then attempt to page the mobile according to any other technology in the mobile's MPCI. The nearby system 301 may save bandwidth by not paging the mobile 221 on any technology that the mobile 221 is not capable of using. If the mobile 221 is found, the call activity is routed to the mobile unit in a format consistent with the access technology.

When the systems 201, 211, and 301 utilizing the present invention are not ANSI compliant systems, the LAT is incorporated in message types appropriate for those systems. For example, an Update Location message in a GSM system is analogous to a Registration Notification message in an ANSI system. A Provide Roaming Number message in a GSM system is analogous to a Route Request message in an ANSI system. A Send Routing Information message in a GSM system is analogous to a Location Request message in an ANSI system. When a system does not support LAT technology, the MSC ignores the LAT, e.g., when sent by an HLR.

The present invention provides a service provider with the capability of using the most limited resources of its system more efficiently. Advantageously, the present invention provides the service provider with the ability to restore bandwidth capacity to existing systems through a software change and without having to grow or modify their system with hardware or reconfiguration. In addition, the present invention benefits current mobiles as well as the latest and greatest mobiles without subjecting existing mobiles to degradation in service.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method comprising the steps of:
  receiving, at a visited system, a registration request to access the visited system via a first access technology for a mobile unit that is associated with a home system having a home location register;
  receiving, at the visited system, a registration request to access the visited system via a second access technology for the mobile unit;
  forwarding, to the home location register, a registration notification including an identification of the second access technology.

2. The method of claim 1, further comprising the step of, when an incoming call to the mobile unit is received at the home system, forwarding the call to the visited system in a format consistent with the second access technology.

3. The method of claim 1, further comprising the step of updating, by the home location register, a record for the mobile unit information indicating the second access technology.

4. The method of claim 1, wherein the registration notification further comprises a request not to return profile information in response to the registration notification.

5. The method of claim 1, further comprising the step of forwarding, to the home location register, a registration notification including an identification of the second access technology.

6. The method of claim 1, wherein the first access technology and the second access technology include any of analog, code division multiple access, time-division multiple access, personal communication services, and global system for mobile communications.

7. A method comprising the steps of:
   receiving, at a home system, call activity for a mobile unit that has a last known location at a visited system;
   determining a first access technology the mobile unit last used to access the visited system that is capable of communication with the mobile unit using at least two different access technologies;
   forwarding, to the visited system, a route request including the first access technology;
   routing, via the visited system, the call activity to the mobile unit in a format consistent with the first access technology.

8. The method of claim 7, wherein the call activity includes any of an incoming call, a short message service delivery, and a message waiting notification.

9. The method of claim 7, further comprising the step of when the call activity is not received by the mobile unit, sending a route request including the first access technology to a system near the home system that is not the visited system.

10. The method of claim 9, wherein the step of sending further comprises sending a mobile protocol capability indicator with the route request.

11. The method of claim 7, wherein the first access technology is stored in a visited location register at the visited system.

12. The method of claim 7, wherein the route request is in compliance with standard ANSI-41.

13. A method comprising the steps of:
   receiving, at a visited system capable of utilizing at least two different access technologies for communication with mobile units, a route request including a first access technology used by a mobile unit;
   forwarding a routing number to a home system for the mobile unit;
   routing call activity to the mobile unit in a format consistent with the first access technology.

14. The method of claim 13, further comprising the step of, when the mobile unit fails to respond to the call activity, notifying the home system of the failure to respond.

15. The method of claim 13, wherein the route request is in compliance with standard ANSI-41.

16. A method comprising the steps of:
   receiving, at a home system, call activity for a mobile unit that has a last known location at a visited system capable of utilizing at least two different access technologies for communicating with mobile units;
   determining a mobile protocol capability indicator for the mobile unit;
   forwarding, to the visited system, a route request including the mobile protocol capability indicator;
   paging the mobile unit according to a first access technology included in the mobile protocol capability indicator.

17. The method of claim 16, further comprising the step of, when the mobile unit responds to the page, routing, via the visited system, the call activity to the mobile unit in a format consistent with the first access technology included in the mobile protocol capability indicator.

18. The method of claim 16, wherein the call activity includes any of an incoming call, a short message service delivery, and a message waiting notification.

19. The method of claim 16, further comprising the step of when the call activity is not received by the mobile unit, sending a route request including the mobile protocol capability indicator to a system near the home system that is not the visited system.

20. The method of claim 19, wherein the step of sending further comprises sending the first access technology with the route request.

21. The method of claim 20, wherein the access technology is stored in a visited location register at the visited system.

22. The method of claim 16, wherein the route request is in compliance with standard ANSI-41.

23. An apparatus comprising:
   a home location register, arranged and constructed to store records for one or more mobile units in a home system;
   a visited location register, arranged and constructed to store records for one or more mobile units presently registered in a visited system in which the visited location register is located;
   wherein the visited system is arranged and constructed to identify a last accessed technology by a mobile unit in the visited system where the last accessed technology is one of at least two different access technologies supported by the visited system and forward the identification of the last accessed technology to the home location register.

24. The apparatus of claim 23, wherein the identification of the last accessed technology is forwarded to the home location register in a registration notification.

25. The apparatus of claim 23, wherein the home system is arranged and constructed to forward a routing request including the identification of the last accessed technology to the visited system.

* * * * *